US 7,643,847 B2

(12) United States Patent
Daanen et al.

(10) Patent No.: US 7,643,847 B2
(45) Date of Patent: Jan. 5, 2010

(54) VERSATILE BASEBAND SIGNAL INPUT CURRENT SPLITTER

(75) Inventors: Anton Daanen, San Jose, CA (US); Matthias Locher, San Jose, CA (US); Olivier Charlon, San Jose, CA (US)

(73) Assignee: ST-Ericsson SA, Geneva (CH)

( * ) Notice: Subject to any disclaimer, the term of this patent is extended or adjusted under 35 U.S.C. 154(b) by 416 days.

(21) Appl. No.: 10/544,888

(22) PCT Filed: Feb. 9, 2004

(86) PCT No.: PCT/US2004/003778

§ 371 (c)(1), (2), (4) Date: Aug. 4, 2005

(87) PCT Pub. No.: WO2004/073188

PCT Pub. Date: Aug. 26, 2004

(65) Prior Publication Data

US 2006/0205365 A1   Sep. 14, 2006

Related U.S. Application Data

(60) Provisional application No. 60/445,582, filed on Feb. 7, 2003.

(51) Int. Cl.
*H04M 1/00* (2006.01)

(52) U.S. Cl. ............... 455/552.1; 455/550.1; 455/103; 455/127.1

(58) Field of Classification Search ............ 455/552.1, 455/553.1, 103, 127.1, 118, 550.1, 551, 105, 455/102
See application file for complete search history.

(56) References Cited

U.S. PATENT DOCUMENTS 4,736,385 A * 4/1988 Pratt et al. ............... 375/219

(Continued)

OTHER PUBLICATIONS

Aggarwal S et al: "A Highly Integrated Dual-Band Triple-Mode Transmit IC for CDMA2000 Applications" Proceedings of the 2002 Bipolar/BICMOS Circuits and Technology Meeting, Minneapolis, MN, Sep. 29-Oct.1, 2002, IEEE Bipolar/BICMOS Circuits and Technology Meeting, New York, NY, IEEE, US, Sep. 29, 2002, pp. 57-60.

*Primary Examiner*—Lana N Le
*Assistant Examiner*—RuiMeng Hu
(74) *Attorney, Agent, or Firm*—E. Russell Tarleton; Seed IP Law Group PLLC

(57) ABSTRACT

A current steering mechanism is provided in a radio transmitter (e.g., a multiband radio transmitter) to provide compatibility with a variety of baseband parts. Different proportions of an input signal current ("in") may be steered to a dummy load (103), a mixer for a first band (106), and a mixer for a second band (108). In one example, five different loads are provided, one dummy load (103) and two different loads (105, 107) for each band. Possibilities include: 1. All current steered into dummy load via transistor A; 2. All current steered into Band 1 mixer via transistor B; 3. All current steered into a Band 1 mixer via transistor C, causing 6 dB input signal amplification; 4. All current steered into Band 2 mixer via transistor E; 5. All current steered into a Band 2 mixer via transistor D, causing 6 dB input signal amplification; 6. Like cases 2-5 but with diversion of some portion of current via a dummy load for attenuation of input signal in 1 dB steps.

27 Claims, 5 Drawing Sheets

U.S. PATENT DOCUMENTS

| | | | |
|---|---|---|---|
| 6,615,027 B1* | 9/2003 | Sahota et al. | 455/91 |
| 7,110,444 B1* | 9/2006 | Sorrells et al. | 375/222 |
| 7,194,242 B2* | 3/2007 | Tanaka et al. | 455/127.3 |
| 7,239,855 B2* | 7/2007 | Matsui et al. | 455/127.1 |
| 7,333,779 B2* | 2/2008 | Yamawaki et al. | 455/118 |
| 2002/0039908 A1* | 4/2002 | Toda et al. | 455/553 |
| 2002/0049075 A1* | 4/2002 | Takagi | 455/553 |
| 2002/0086650 A1* | 7/2002 | Haapoja | 455/120 |
| 2002/0177465 A1* | 11/2002 | Robinett | 455/552 |
| 2003/0054779 A1* | 3/2003 | Losser et al. | 455/127 |
| 2003/0193923 A1* | 10/2003 | Abdelgany et al. | 370/342 |
| 2003/0203743 A1* | 10/2003 | Sugar et al. | 455/550.1 |
| 2004/0137941 A1* | 7/2004 | Tanaka et al. | 455/552.1 |
| 2004/0209584 A1* | 10/2004 | Bargroff et al. | 455/180.1 |
| 2004/0218576 A1* | 11/2004 | Imagawa et al. | 370/342 |
| 2005/0014476 A1* | 1/2005 | Oono et al. | 455/118 |
| 2005/0213672 A1* | 9/2005 | Lin et al. | 375/257 |
| 2007/0026824 A1* | 2/2007 | Ono et al. | 455/127.1 |
| 2007/0087702 A1* | 4/2007 | Kato et al. | 455/102 |
| 2007/0142080 A1* | 6/2007 | Tanaka et al. | 455/552.1 |

* cited by examiner

VERSATILE BASEBAND SIGNAL INPUT CURRENT SPLITTER

CROSS REFERENCE TO RELATED APPLICATION

This application claims the benefit of U.S. provisional application Ser. No. 60/445,582 filed 7 Feb. 2003, which is incorporated herein by reference.

The present invention relates to Radio Frequency (RF) transmitters and particularly to interface circuitry for interfacing a baseband portion of a radio transmitter to a radio portion of the radio transmitter.

Radio transmitters are commonly partitioned into a baseband portion and a radio portion. The baseband portion may produce, for example, an-information-bearing current signal for input to the radio portion. The radio portion produces a frequency-translated and amplified signal corresponding to the information-bearing current signal and transmits the amplified signal.

The baseband portion and the radio portion may be produced by the same vendor or by different vendors. To allow for the circumstance that the baseband portion and the radio portion are produced by different vendors, it is desirable for a radio part, for example, to be interface compatible with a wide variety of baseband parts.

A current steering mechanism is provided in a radio transmitter (e.g., a multiband radio transmitter) to provide compatibility with a variety of baseband parts. Different proportions of an input signal current may be steered to a dummy load, a mixer for a first band, and a mixer for a second band. In one example, five different loads are provided, one dummy load and two different loads for each band. Possibilities include: 1. All current steered into dummy load via transistor A; 2. all current steered into a Band1 mixer via transistor B; 3. all current steered into Band1 mixer via transistor C, causing 6 dB input signal amplification; 4. all current steered into a Band2 mixer via transistor D; 5. all current steered into Band2 mixer via transistor E, causing 6 dB input signal amplification; 6. like cases 2-5 but with diversion of some portion of current via dummy load for attenuation of the input signal in 1 dB steps.

The present invention may be more fully understood from the following description in conjunction with the appending drawing figures. In the drawing.

Figure 1:
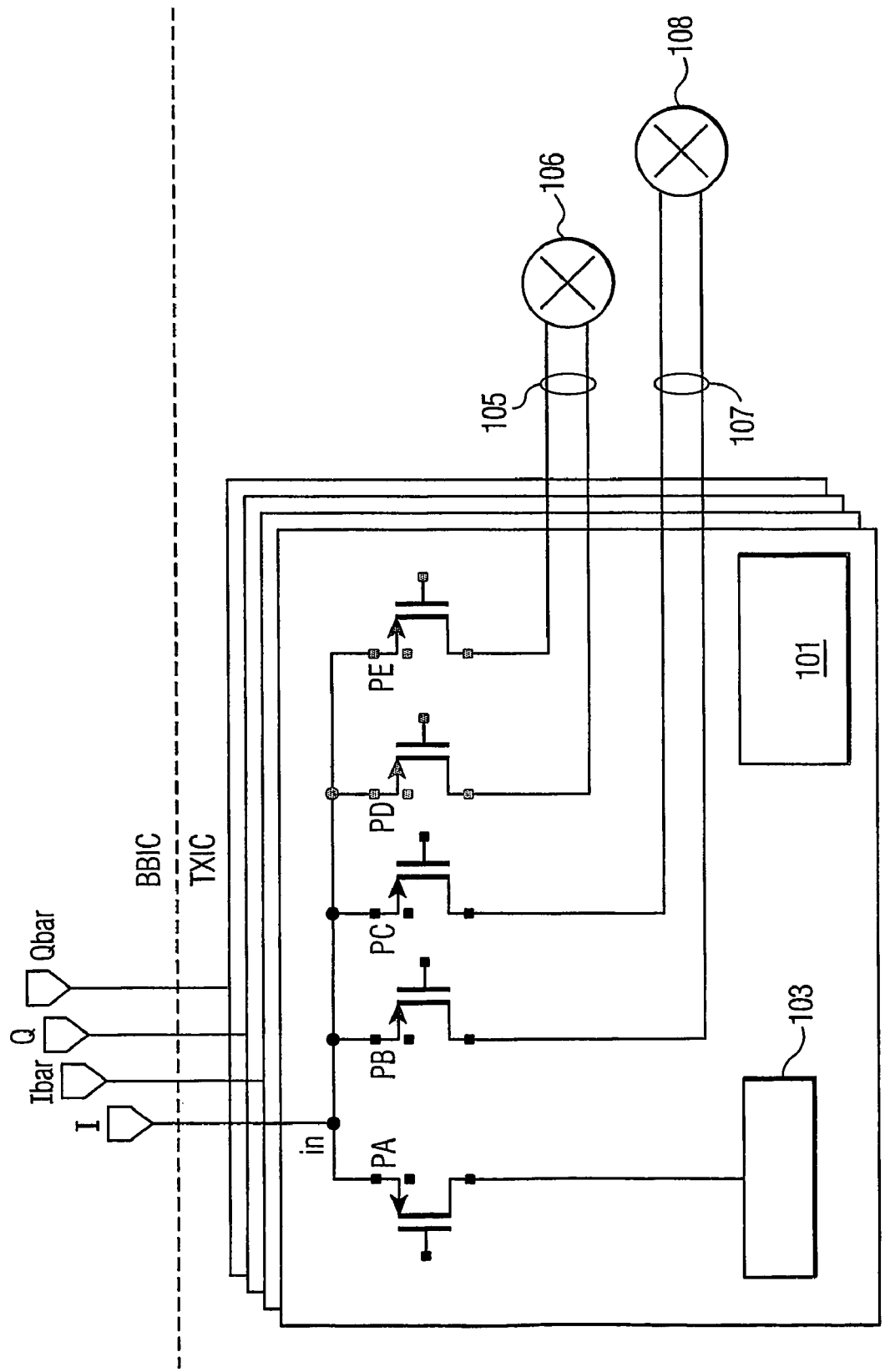
FIG. 1 is a simplified block diagram showing a portion of a radio transmitter including the present splitter circuit.

The following detailed description relates to the input circuit on a radio frequency transmitter IC (TMXC) that receives the modulated TX signal current from a mixed-signal baseband IC (BBIC). To enable low production cost the BBIC is implemented in a CMOS process, whereas the TXIC is best implemented in a BiCMOS process for optimum performance at lowest possible current consumption. This set up of a separate BBIC and TXIC in principle allows the use of one TXIC together with a BBIC of various manufacturers. Due to this approach the to be transmitted signal at the physical interface of the BBIC and TXIC needs to have a well defined specification.

It is desirable to provide an input circuit on the TXIC that enables the use of various BBIC, each having a different interface signal specification. The input circuit described here is applicable to CDMA (IS-95)/CDMA2000 mobile applications which have a TX interface signal with a bandwidth of 1 to several MHz. However the input circuit could also be used elsewhere, e.g., in similar applications of W-CDMA or WLAN, having comparable bandwidths. Because of the TX signal bandwidth at the BBIC and TXIC interface it is advantageous to use a signal current (as opposed to a signal voltage) because the signal quality and BBIC supply current consumption are much less influenced by parasitic capacitances at the interface CPCB and IC package parasitic capacitances, for example). Although it is not necessary to use a signal current it is the signal of choice for most manufacturers of BBIC in the foregoing application areas.

The signal current can be described as having a DC component and having superposed thereon an AC signal whose amplitude typically will not exceed the DC value, but this is not a requirement.

Another typical feature of the TX interface between BBIC and TXIC in the foregoing applications is that there are actually four physical lines, two forming a differential signal for the I (in-phase) channel and the other two forming a differential signal for the Q (quadrature) channel. In the embodiment described herein, the input circuit is used four times to handle both differential I and Q channels. This feature, however, is not essential. Each of the four physical lines carries a DC component of preferably identical value and an AC component of preferably identical amplitude only differing in the amount of phase shift (0, 90, 180 and 270 degrees).

The input circuit described herein provides a method to divide a signal input current into multiple parts and redirect each part to a different load circuit. Hence the circuit is given the name 'splitter'.

In an exemplary embodiment, the splitter circuit is described for use in a CDMA TXIC that needs to operate in two frequency bands, called CELL and PCS. Only one band is used at a time, and switching between bands is application dependent. Note that for operation in either band the signal going through the splitter remains identical, although this is not a necessity for splitter operation. Although not explicitly described herein, the same switching arrangement can be employed in other applications than CDMA CELL and PCS operation, e.g., to switch between two channels, or to interchange I with Ibar and/or Q with Qbar.

Referring now to FIG. 1, the signal input current (I, Ibar, Q or Qbar) enters the splitter at node 'in' and will find its way through one or more of the available PMOS transistors (PA, PB, PC, PD, PE). The PMOS transistors are controlled by control logic 101, which may be a set of digital CMOS logic inverters, whose outputs are either high (equal to the supply voltage) or low (equal to a clean ground). This causes the PMOS transistors to be either on (conducting) or off (not conducting). All PMOS transistors have their source terminals connected to the input node 'in'. Each drain terminal is connected to one of five possible load circuits. There is one load circuit 103 called 'dummy load', two load circuits 105 coupled to a CELL band mixer 106 for CELL band operation and two load circuits 107 coupled to a PCS band mixer 108 for PCS band operation.

Figure 2:
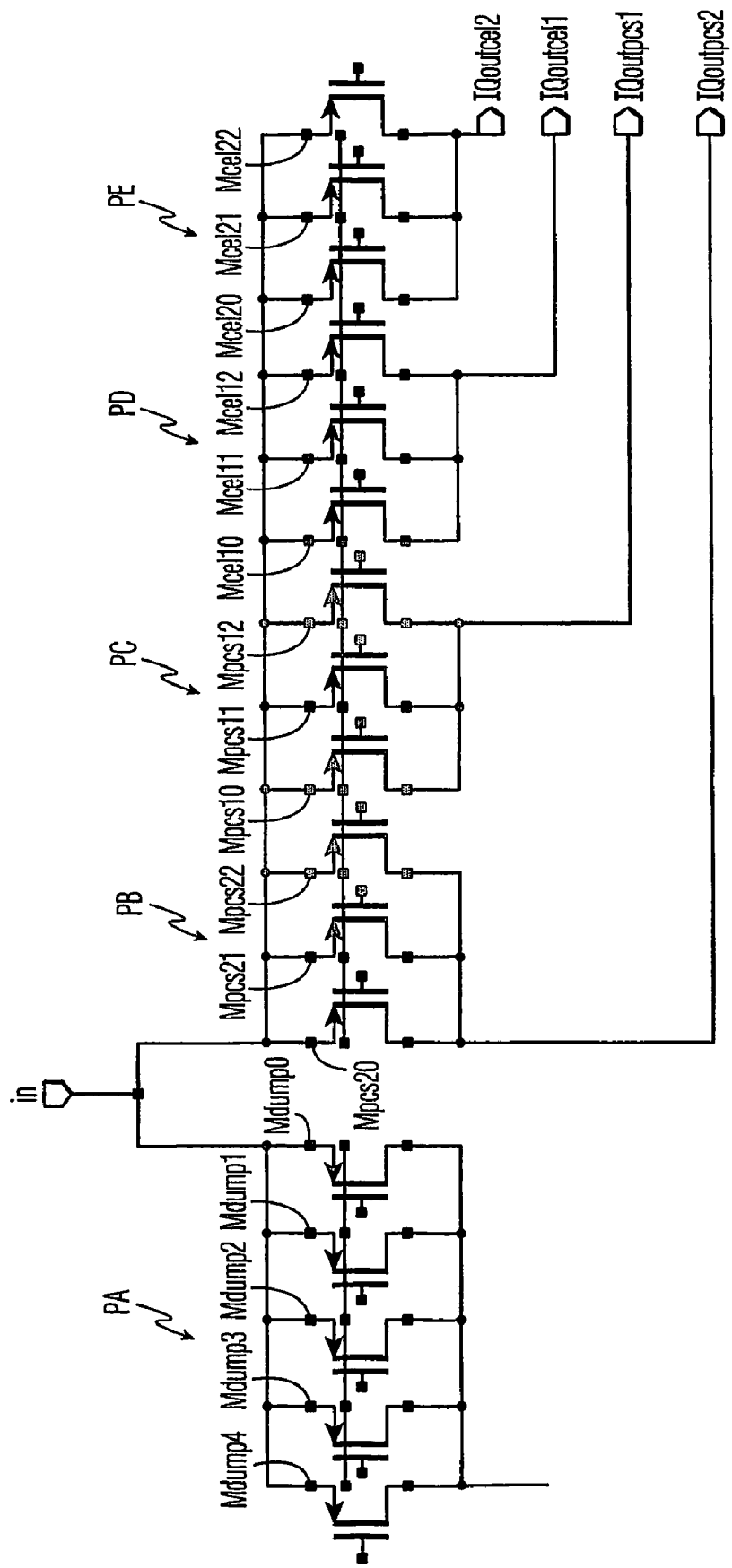
FIG. 2 is diagram showing the splitter circuit of FIG. 1 in greater detail.

Referring to FIG. 2, the PMOS transistors themselves may consist of multiple smaller units, where each unit PMOS has the same W/L size. The control logic block 101 can separately control the gate terminals of each PMOS unit transistor. Decoding is performed to determined which of the PMOS unit transistors is on or off. This construction allows either the whole input current or a certain part thereof to be steered into the dummy load.

Figure 3:
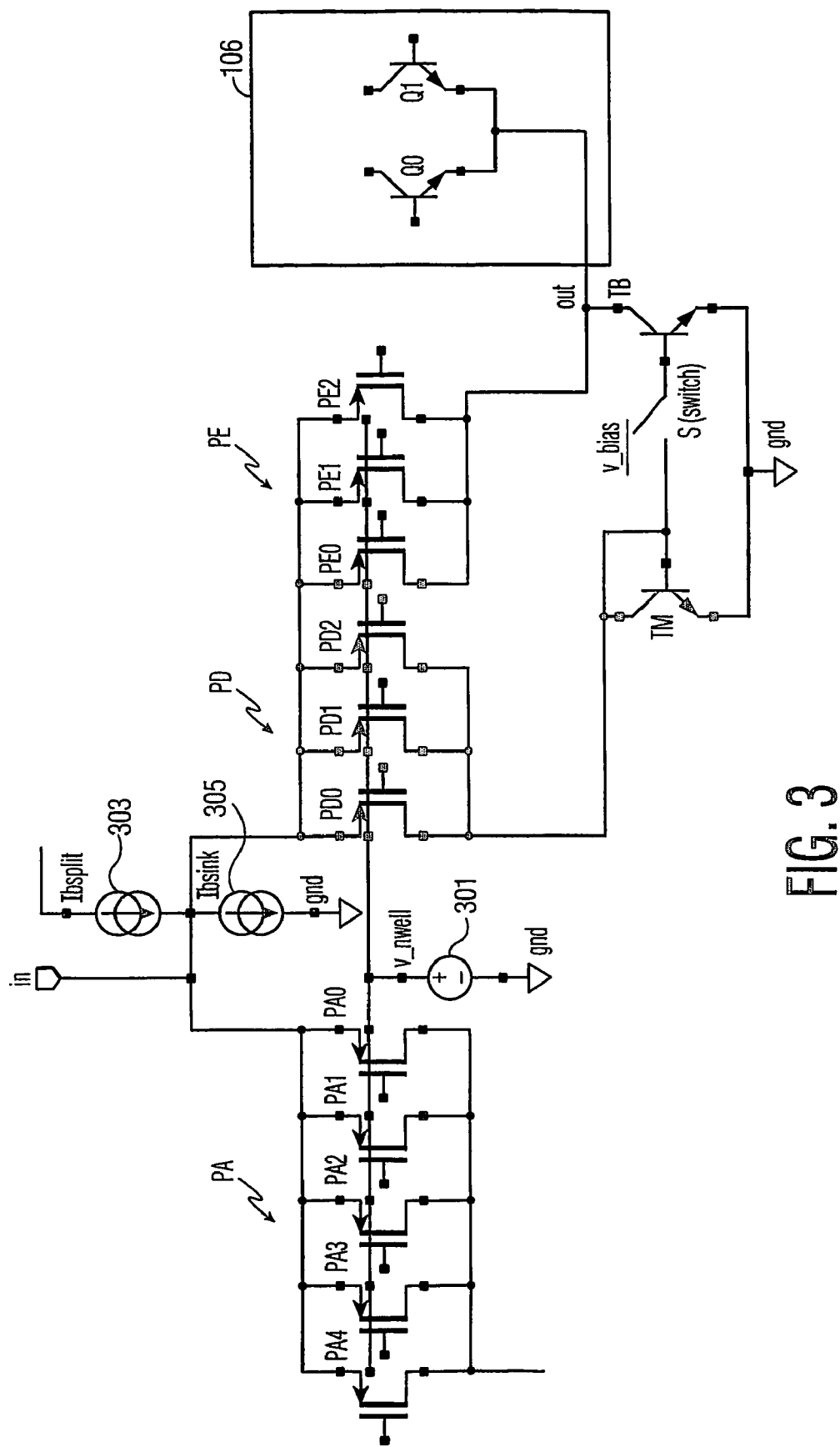
FIG. 3 is a diagram showing an alternative embodiment of the splitter circuit of FIG. 2 (only CELL band shown)

Referring to FIG. 3, a load circuit of the mixers 106 and 108 is shown in greater detail. For the sake of simplicity the drawing in FIG. 3 only shows details of the load circuit for the CELL band operation, but an analogous load circuit is present for PCS band operation but will not further be described here.

The circuit of FIG. 3 may best be understood by considering various operating conditions. One particular case is where the total signal input current is steered into the dummy load via PA. This condition satisfies two objectives: to provides a means of operating the transmit path (i.e., subsequent to the splitter) with no input signal, and to provide a low input impedance to the BBIC when the TXIC transmit path is inactive. A low input impedance prevents the voltage at node 'in' from rising to the positive rail supply voltage of the BBIC.

Another particular case is where the total signal input current is steered into the circuit for CELL band operation directly (i.e., via PE). In this case a transistor TB provides a constant bias current and its base is connected to a fixed bias voltage (v_bias) via a switch S. There is no amplification of the signal. This case is comparable to the prior art situation in which no splitter would be present and node 'out' would be identical to node 'in'.

A third particular case is where the total signal input current is steered into a transistor TM for CELL band operation via PD. The base of transistor TB is now connected to TM via switch S, such that the resulting circuit consisting of TM and TB forms a current mirror with a fixed ratio 1:A. The value A is chosen in accordance with the particular application; in the case of CDMA, for example, the value A may be set to 2. Therefore the splitter amplifies the signal by 6 dB and this allows for the signal input current to be smaller by a factor of two while still providing the same output signal current as in the previous case from node 'out' into the transmit circuit part (cascode and upconverter mixer). This construction simplifies the circuit design of the cascode and upconverter mixer considerably, as will be clear to any person skilled in the art of designing such circuits.

Yet another case is where only part of the signal input current is steered into the dummy load via PA and the other part is steered into one of the circuits for CELL band operation. The latter part is steered either directly (i.e., via PE) to the node 'out' with transistor TB providing a constant bias current, or it is steered (via PD) into transistor TM with TM and TB forming a current mirror with a fixed ratio 1:A. This arrangement adds the ability to divert small portions of the signal input current to the dummy load, thus causing a small attenuation of the signal current. By proper choice of the number of PMOS unit transistors connected to each of the logic inverters of the decoding block, accurately defined attenuation steps with, e.g., 1 dB resolution can be made. In this mode of operation the accuracy of the ratio of the used and unused current is dependent on the fact that the PMOS unit transistors that are on are in the same saturated mode (this means that $|Vds|>|Vgs||VTP|$, otherwise written as $Vd<Vg+VTP$, where VTP is the PMOS threshold voltage, e.g. 0.7V). The accuracy also depends on any physical mismatch between the PMOS unit transistors.

The input impedance seen by the BBIC is $1/gm$, with gm being the total parallel transconductance of the PMOS unit transistors that are switched on. This input impedance $1/gm$ can be low by choosing the PMOS unit transistor size W/L large enough. This W/L size also determines how large the common mode voltage will be as seen by the BBIC. It is preferable to have this voltage specified so as to not exceed a certain value (e.g., 1.2V) which enables independent design of the BBIC and TXIC. The common mode voltage as seen by the BBIC is further determined by the low voltage applied to the gate of the PMOS unit transistors that are on, which is equal to the ground potential in the illustrated embodiment, and the amount of DC current that flows through these PMOS unit transistors.

At node 'out' a certain minimum voltage (e.g. 0.8V) is needed to maintain proper operation of the transistor TB in either case of providing the constant bias current or the signal dependent current.

It will be appreciated, therefore, that whereas on the one hand the voltage Vd must be small enough to keep the PMOS transistors in saturation to assure that the input common mode voltage not exceed a certain specified value, on the other hand the voltage Vd must be larger than a certain minimum for proper operation of TB.

In order to maximize the range of possible values of Vd that still satisfy the requirements, it may be desirable to add a PMOS back bias voltage (V_nwell) different from either the supply rail voltage or the voltage at node 'in'. For CDMA for example, a PMOS back bias voltage of 1.6V has been found to provide satisfactory results. Referring still to FIG. 3, a voltage source 301 is provided for this purpose.

By using PMOS transistors to steer the signal input current, no signal is lost, while the PMOS transistors require virtually no gate current.

From a BBIC design perspective, ideally the DC component of the signal input current is equal to the superposed AC component amplitude such that the signal input current will always flow in the same direction and power consumption is minimized. With this BBIC signal, the signal input current into the TXIC varies between zero and two times the DC component. However the 'splitter' circuit has a provision that allows it to handle other values of the DC component as well. For this purpose, as shown in FIG. 3, there are two DC current sources 303, 305 that can be active or not and can be programmed in value.

One DC current source 303 (Ibsplit) adds a current going into node 'in'; this current is active if the DC component of the signal input current is equal to or smaller than the superposed AC component amplitude. Another DC current source 305 (Ibsink) subtracts a current from node 'in' to ground; this current is active if the DC component of the signal input current is larger (by a certain minimum amount) than the superposed AC component amplitude.

The values of Ibsplit and Ibsink are chosen such that there will always be a minimum current through either TM and/or TB in order to minimize AC signal distortion as well as to assure that the current going into the load circuit (CELL or PCS) is not too high, in order to prevent distortion in the transmit circuit part after node 'out'.

In an implementation of the described splitter, the following modes are defined:

| | |
|---|---|
| mode 1 | 1.00 mAdc +/− 1.0 mA |
| mode 1a | 1.25 mAdc +/− 1.0 mA |
| mode 2 | 1.00 mAdc +/− 0.5 mA |
| mode 2a | 1.00 mAdc +/− 0.5 mA |
| mode 2b | 0.50 mAdc +/− 0.5 mA |

Figure 4:
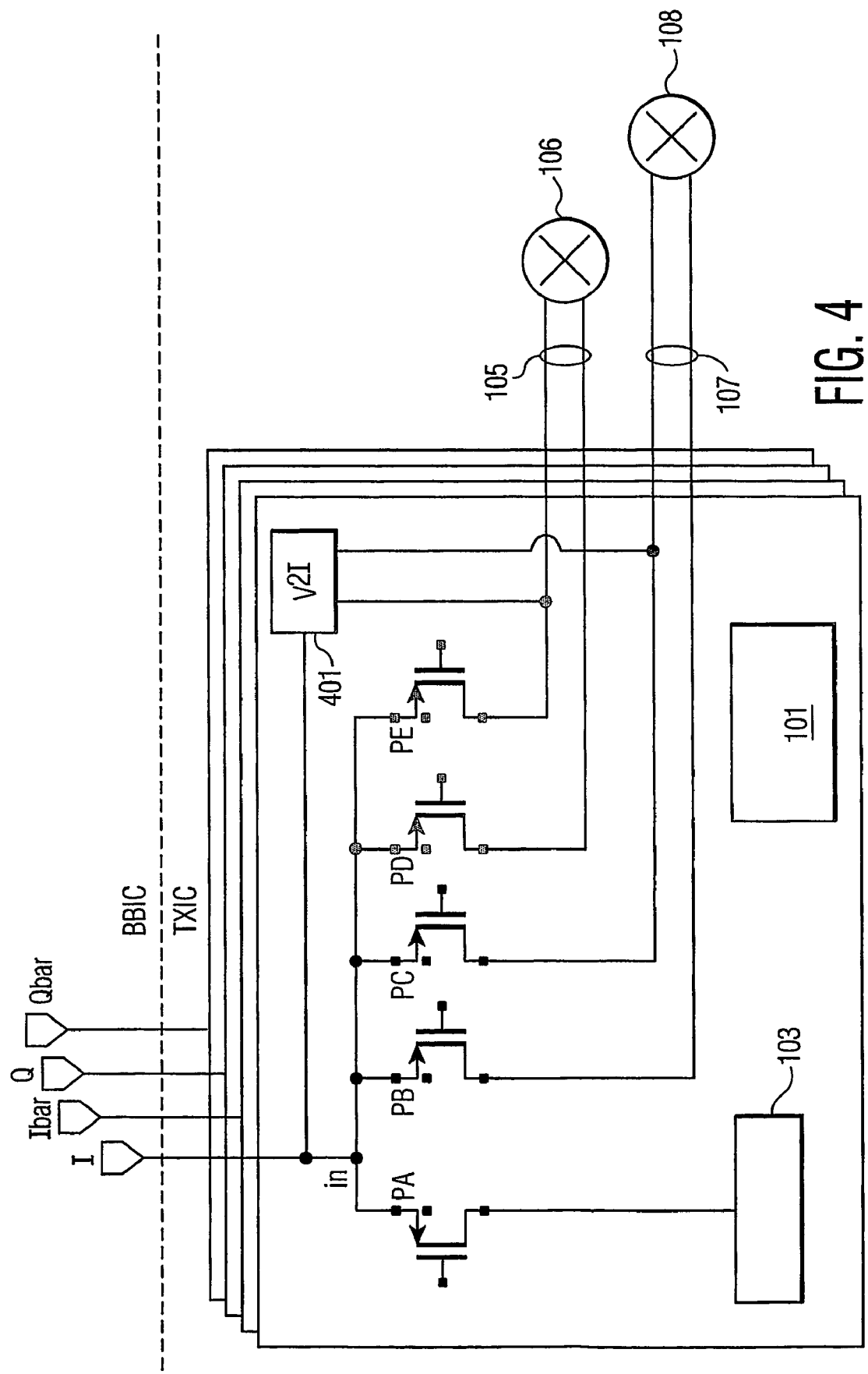
FIG. 4 is a diagram showing a further embodiment of the present invention.

To further increase the versatility of the radio frequency transmitter IC, it may be provided with a voltage-to-current converter (V2I) 401 as shown, for example, in FIG. 4. This modification allows the radio frequency transmitter IC to be used with baseband ICs that produce voltage outputs instead of current outputs. The V2I converter may be connected in parallel with the current splitter previously described, selection of either the V2I converter or the current splitter being controlled through a control register, for example.

Figure 5:
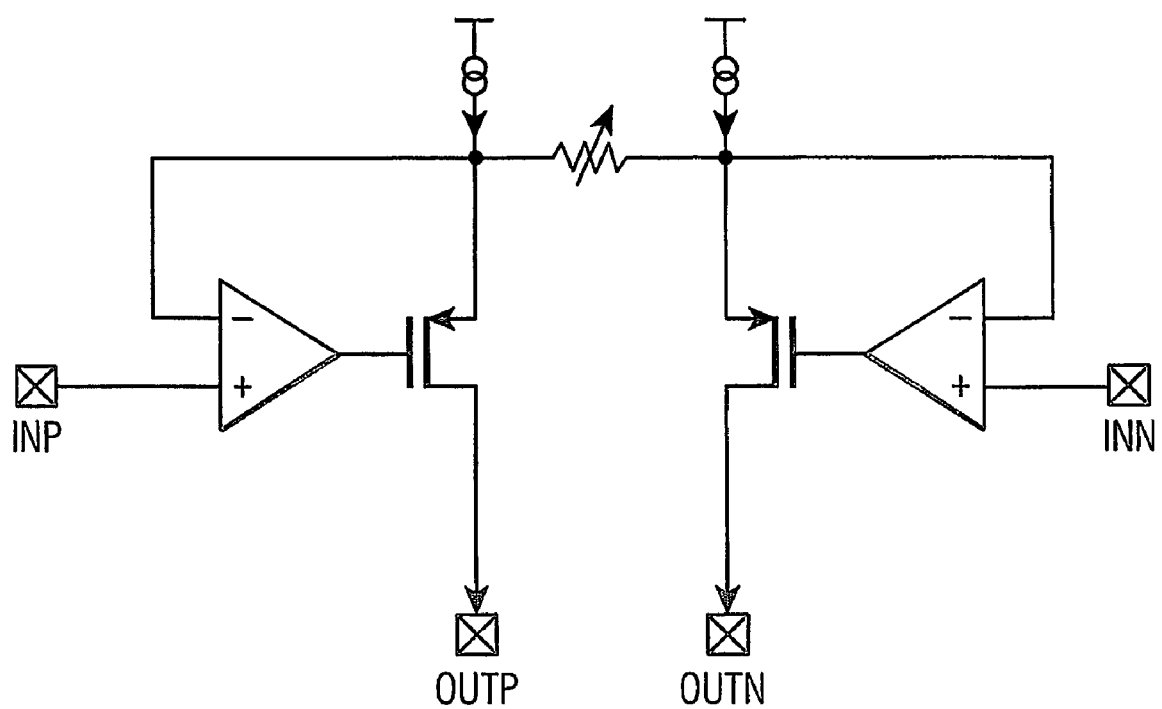
FIG. 5 is a diagram showing in greater detail the V2I converter of FIG. 4.

Referring to FIG. 5, further details of the V2I converter are shown. The V2I converter is fully differential, receiving positive and negative voltage inputs INP and INN and producing positive and negative current outputs OUTP and OUTN. The circuit of FIG. 5 therefore represents two instances of the block 401 in FIG. 4, one instance for example receiving the positive input I (presumed now to be a voltage input) and another instance receiving the negative input Ibar (also presumed now to be a voltage input). By using the same input pins for both current inputs and voltage inputs, pin count may be minimized.

Referring still to FIG. 5, the fully-differential structure is independent of baseband offsets (common mode variation) and preferably provide a high input impedance, thereby supporting baseband parts that provide only weak drive signals. A variable resistor provides compensation for process variations. The resistor may be digitally controlled using switches, for example. The same switches may also be used in some embodiments to adjust to different baseband signal levels and/or to provide a VGA-like function.

It will be appreciated by those of ordinary skill in the art that the present invention can be embodied in other specific forms without departing from the spirit or essential character thereof The disclosed embodiments are intended in all respects to be illustrative and not restrictive. The invention is defined by the appended claims rather the foregoing description, and all changes which come within the range of equivalents thereof are intended to be embraced therein.

What is claimed is:

1. A method of interfacing a baseband portion and a radio portion of a radio transmitter, comprising: receiving at the radio portion a current signal from the baseband portion; and selectively apportioning the current signal between multiple paths of the same polarity having respective load circuits, including multiple mixer paths and a dummy load path, to steer different proportions of the current signal to the dummy load path.

2. The method of claim 1, wherein the multiple mixer paths and the dummy load path have input impedances such that for each such impedance a voltage drop across that impedance is not greater than a predetermined maximum.

3. The method of claim 1, wherein the radio transmitter is a multiband radio transmitter, and the multiple mixer paths include a highband path and a lowband path.

4. The method of claim 1, wherein the multiple mixer paths include first and second paths coupled to a single mixer, the first path providing little or no signal amplification and the second path providing signal amplification of at least several decibels.

5. The method of claim 1, wherein a portion of the current signal apportioned to the dummy load path is controlled according to discrete values within a predetermined range.

6. The method of claim 5, wherein the discrete values are separated by approximately one decibel.

7. The method of claim 5, wherein the predetermined range includes apportioning substantially all of the current signal to the dummy load path.

8. The method of claim 1, wherein the radio transmitter is a multiband radio transmitter, and the multiple mixer paths include first and second highband paths and first and second lowband paths.

9. The method of claim 8, wherein the first and second highband paths are coupled to a single mixer, the first highband path providing little or no signal amplification and the second highband path providing signal amplification of at least several decibels.

10. The method of claim 8, wherein the first and second lowband paths are coupled to a single mixer, the first lowband path providing little or no signal amplification and the second lowband path providing signal amplification of at least several decibels.

11. An apparatus for interfacing a baseband portion and a radio portion of a radio transmitter, comprising: means for receiving at the radio portion a current signal ('in') from the baseband portion; and means for selectively apportioning the current signal between multiple paths of the same polarity, including multiple mixer paths having a load circuit and a dummy load path and selectively steering different proportions of the current signal to the dummy load path.

12. The apparatus of claim 11, wherein the multiple mixer paths and the dummy load path have input impedances such that for each such impedance a voltage drop across that impedance is not greater than a predetermined maximum.

13. The apparatus of claim 11, wherein the radio transmitter is a multiband radio transmitter, and the multiple mixer paths include a highband path and a lowband path.

14. The apparatus of claim 11, wherein the multiple mixer paths include first and second paths coupled to a single mixer, the first path providing little or no signal amplification and the second path providing signal amplification of at least several decibels.

15. The apparatus of claim 11, wherein a portion of the current signal apportioned to the dummy load path is controlled according to discrete values within a predetermined range.

16. The apparatus of claim 15, wherein the discrete values are separated by approximately one decibel.

17. The apparatus of claim 15, wherein the predetermined range includes apportioning substantially all of the current signal to the dummy load path.

18. The apparatus of claim 11, wherein the radio transmitter is a multiband radio transmitter, and the multiple mixer paths include first and second highband paths and first and second lowband paths.

19. The apparatus of claim 18, wherein the first and second highband paths are coupled to a single mixer, the first highband path providing little or no signal amplification and the second highband path providing signal amplification of at least several decibels.

20. The apparatus of claim 18, wherein the first and second lowband paths are coupled to a single mixer, the first lowband path providing little or no signal amplification and the second lowband path providing signal amplification of at least several decibels.

21. The apparatus of claim 11, further comprising means for selectively varying said current signal.

22. The apparatus of claim 21, wherein the means for selectively varying said current signal includes means for selectively increasing said current signal and means for selectively decreasing said current signal.

23. A circuit for interfacing a baseband portion and a radio portion of a radio transmitter, comprising: a current splitter for selectively apportioning a current input signal received at the radio portion from the baseband portion concurrently between multiple paths of the same polarity having respective load circuits, including multiple mixer paths and a dummy load path, and steering different proportions of the current input signal to the dummy load path.

24. The circuit of claim 23 wherein the current splitter comprises multiple proportioning units controlled by a control logic circuit.

25. The circuit of claims 23, wherein the current splitter comprises:
   a plurality of input nodes, each input node adapted to receive a phase of the current input signal; and
   a plurality of proportioning units coupled to each input node and to a control logic circuit that controls the proportioning units to steer selected proportions of the phase of the current input signal to the dummy load path.

26. The circuit of claim 25, wherein the plurality of proportioning units comprises a plurality of transistors, each transistor having a first conducting terminal coupled to the input node, a second conducting terminal coupled to a load circuit, and a control terminal coupled to the control logic circuit.

27. The circuit of claim 26, wherein the plurality of transistors each have a same width/length size.

* * * * *

UNITED STATES PATENT AND TRADEMARK OFFICE
CERTIFICATE OF CORRECTION

PATENT NO.       : 7,643,847 B2                                    Page 1 of 1
APPLICATION NO.  : 10/544888
DATED            : January 5, 2010
INVENTOR(S)      : Daanen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Sixteenth Day of November, 2010

David J. Kappos
*Director of the United States Patent and Trademark Office*